United States Patent
Berger et al.

(10) Patent No.: US 12,403,783 B2
(45) Date of Patent: Sep. 2, 2025

(54) CHARGING SYSTEM AND METHOD OF USING SAME

(71) Applicant: HILLCREST ENERGY TECHNOLOGIES LTD., Vancouver (CA)

(72) Inventors: Ari Berger, Vancouver (CA); Harald Hengstenberger, Fürstenfeldbruck (DE); Jalal Amini, Vancouver (CA)

(73) Assignee: Hillcrest Energy Technologies Ltd., Vancouver (CA)

( * ) Notice: Subject to any disclaimer, the term of this patent is extended or adjusted under 35 U.S.C. 154(b) by 101 days.

(21) Appl. No.: 18/564,040

(22) PCT Filed: May 26, 2022

(86) PCT No.: PCT/CA2022/050859
§ 371 (c)(1),
(2) Date: Nov. 24, 2023

(87) PCT Pub. No.: WO2022/246573
PCT Pub. Date: Dec. 1, 2022

(65) Prior Publication Data
US 2024/0253490 A1 Aug. 1, 2024

Related U.S. Application Data

(60) Provisional application No. 63/193,361, filed on May 26, 2021.

(51) Int. Cl.
*B60L 53/20* (2019.01)
*H02J 7/00* (2006.01)
(Continued)

(52) U.S. Cl.
CPC .......... *B60L 53/20* (2019.02); *H02J 7/0029* (2013.01); *H02J 7/0047* (2013.01); *H02J 7/02* (2013.01);
(Continued)

(58) Field of Classification Search
CPC ....... B60L 53/20; H02M 3/1586; H02M 1/10; H02M 7/797; H02J 7/0029; H02J 7/02; H02J 7/163; H02J 2207/20
See application file for complete search history.

(56) References Cited

U.S. PATENT DOCUMENTS

2018/0164362 A1 * 6/2018 Premerlani .......... G01R 31/007
2020/0395764 A1 * 12/2020 Kuznetsov ........ H02J 7/007182

FOREIGN PATENT DOCUMENTS

FR         3055489 A1 *  3/2018 ............. H02K 19/36
WO    WO-2015150109 A1 * 10/2015 ............... H02K 1/28

OTHER PUBLICATIONS

Nayak, et al. "An Improved Control Method for the DC-DC Converter in Vehicle to Grid Charging System", 117 14th IEEE India Council International Conference (INDICON), Dec. 17, 2017 (Dec. 17, 2017), pp. 1-6 [online] [retrieved Aug. 8, 2022 (Aug. 8, 2022)].Retrieved from the Internet: <http://ieeexplore.ieee.org/documents/8487809>.

(Continued)

*Primary Examiner* — Jared Fureman
*Assistant Examiner* — Duc M Pham
(74) *Attorney, Agent, or Firm* — McMillan LLP

(57) ABSTRACT

A charging system and a method of operating the same are provided. The charging system includes an electric machine which may be a wound or un-wound rotor type or a doubly fed induction motor (DFIM). A control system is coupled to the electric machine and a battery system. In the case of a wound rotor, the control system is coupled to stator windings (Continued)

and a rotor winding for controlling excitation of the stator windings and the rotor winding. The charging system is AC and DC compatible. In the case of an AC power source, the control system injects excitation into a rotor winding to induce a desired voltage in the stator, if the power supply voltage of the power supply is greater or smaller than the voltage of the battery system. Other modes of operation allowing for safe charging and discharging of a battery system are also described herein.

26 Claims, 14 Drawing Sheets

(51) Int. Cl.
  *H02J 7/02* (2016.01)
  *H02J 7/14* (2006.01)
  *H02J 7/16* (2006.01)
  *H02M 1/10* (2006.01)
  *H02M 3/158* (2006.01)
  *H02M 7/797* (2006.01)

(52) U.S. Cl.
  CPC ............ *H02J 7/1423* (2013.01); *H02J 7/163* (2013.01); *H02M 1/10* (2013.01); *H02M 3/1586* (2021.05); *H02M 7/797* (2013.01); *H02J 2207/20* (2020.01)

(56) References Cited

OTHER PUBLICATIONS

Singh et al., "Charging of Electric Vehicles Battery Using Bidirectional Converter", 2020 International Conference on Electrical and Electronics Engineering (ICE3), Feb. 15, 2020 (Feb. 15, 2020), pp. 82-88, [online] [retrieved on Aug. 8, 2020 (Aug. 2022). Retrieved from the internet: <http://ieeexplore.ieee.org/documetn/9122843>.

* cited by examiner

CHARGING SYSTEM AND METHOD OF USING SAME

CROSS-REFERENCE TO RELATED APPLICATIONS

This application claims the benefit of U.S. provisional application 63/193,361, filed May 26, 2021, the contents of which are incorporated herein by reference in their entirety.

FIELD

The specification relates generally to electric motors. This specification also relates to a charging system and method for using the same.

BACKGROUND OF THE DISCLOSURE

The advent of electric vehicles has accelerated the adoption of new ways of consuming energy. With the increasing adoption of electric and hybrid vehicles, the demand for flexible energy management solutions is becoming increasingly apparent.

With the increasing use of electric vehicles and the capability of charging battery packs in residential areas, there is a shift in the mix of energy consumption and storage. However, increasing the capacity of electric utility providers is an expensive endeavor that may prove uneconomical to serve the future needs of increased electric vehicle adoption and other means of electric power consumption.

Existing approaches to mitigate this problem include utilizing solar panels at residential and other locations to feed a smart electric grid. Other approaches include the use of other renewable energy resources such as, wind, geothermal, hydropower and ocean resources, solid biomass, biogas and liquid biofuels to provide auxiliary power into the grid.

However, improved management of other potential sources of energy, such as energy stored in vehicle battery systems are desired. For example, electric vehicle battery packs may be storing energy that may not be of immediate use to the vehicle owner that may be better utilized elsewhere.

It is thus an object of the present disclosure to provide systems and methods to mitigate some of the aforementioned problems.

SUMMARY OF THE DISCLOSURE

According to a part of the disclosure, there is provided a charging system comprising: an electric machine having at least three stator windings and at least one rotor winding; and a control system coupled to the at least three stator windings and the at least one rotor winding for controlling excitation of each of the at least three stator windings and the at least one rotor winding, wherein in at least one of a charging mode, a discharging mode: the control system determines if a power source voltage of a power source is outside of a voltage operating range of a battery system being charged or discharged; the control system applies an excitation voltage on the at least one rotor winding when the power source voltage is outside the voltage operating range of the battery system; and the control system terminates the excitation of each of the at least one rotor winding when the power source voltage is within the voltage operating range of the battery system.

According to another part of the disclosure, there is provided a charging system, comprising: an electric machine having at least three stator windings and at least one rotor winding; and a control system coupled to the at least three stator windings and the at least one rotor winding for controlling excitation of each of the at least three stator windings and the at least one rotor winding, wherein in at least one of a charging mode or a discharging mode: the control system determines the type of a power source. Upon determining that the type of the power source is DC: the control system bypasses the electric machine to charge the battery system from the power source, upon finding the power supply voltage Vs of the power supply is within a voltage operating range of a battery system; otherwise protects the battery system upon finding that Vs is greater than an upper limit of the voltage operating range. Otherwise upon determining that the type of the power source is AC: the control system connects a fast charger to the battery system; injects excitation into the at least one rotor winding to induce a voltage in the stator windings with 180 degree phase shift to the voltage of the power source, upon finding the power supply voltage Vs of the power supply is greater than the voltage of the battery system; otherwise terminating the excitation into one of the at least one rotor winding, upon finding the power supply voltage Vs of the power supply is not significantly lower than the voltage of the battery system; otherwise injecting excitation into one of the at least one rotor winding to induce an in-phase voltage.

According to another part of the disclosure, there is provided a method of operating a charging system comprising an electric machine having at least three stator windings and at least one rotor winding; and a control system coupled to the at least three stator windings and the at least one rotor winding for controlling excitation of each of the at least three stator windings and the at least one rotor winding, the method comprising: in at least one of a charging mode or a discharging mode: determining the type of a power source; upon determining that the type of the power source is DC: bypassing the electric machine to charge the battery system from the power source, upon finding the power supply voltage Vs of the power supply is within a voltage operating range of a battery system; otherwise protecting the battery system upon finding that Vs is greater than an upper limit of the voltage operating range. Otherwise, upon determining that the type of the power source is AC: connecting a fast charger to the battery system; injecting excitation into the at least one rotor winding to induce a voltage in the stator windings with 180 degree phase shift to the voltage of the power source, upon finding the power supply voltage Vs of the power supply is greater than the voltage of the battery system; otherwise terminating the excitation into one of the at least one rotor winding, upon finding the power supply voltage Vs of the power supply is not significantly lower than the voltage of the battery system; otherwise injecting excitation into one of the at least one rotor winding to induce an in-phase voltage.

This summary does not necessarily describe the entire scope of all aspects of the disclosure. Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
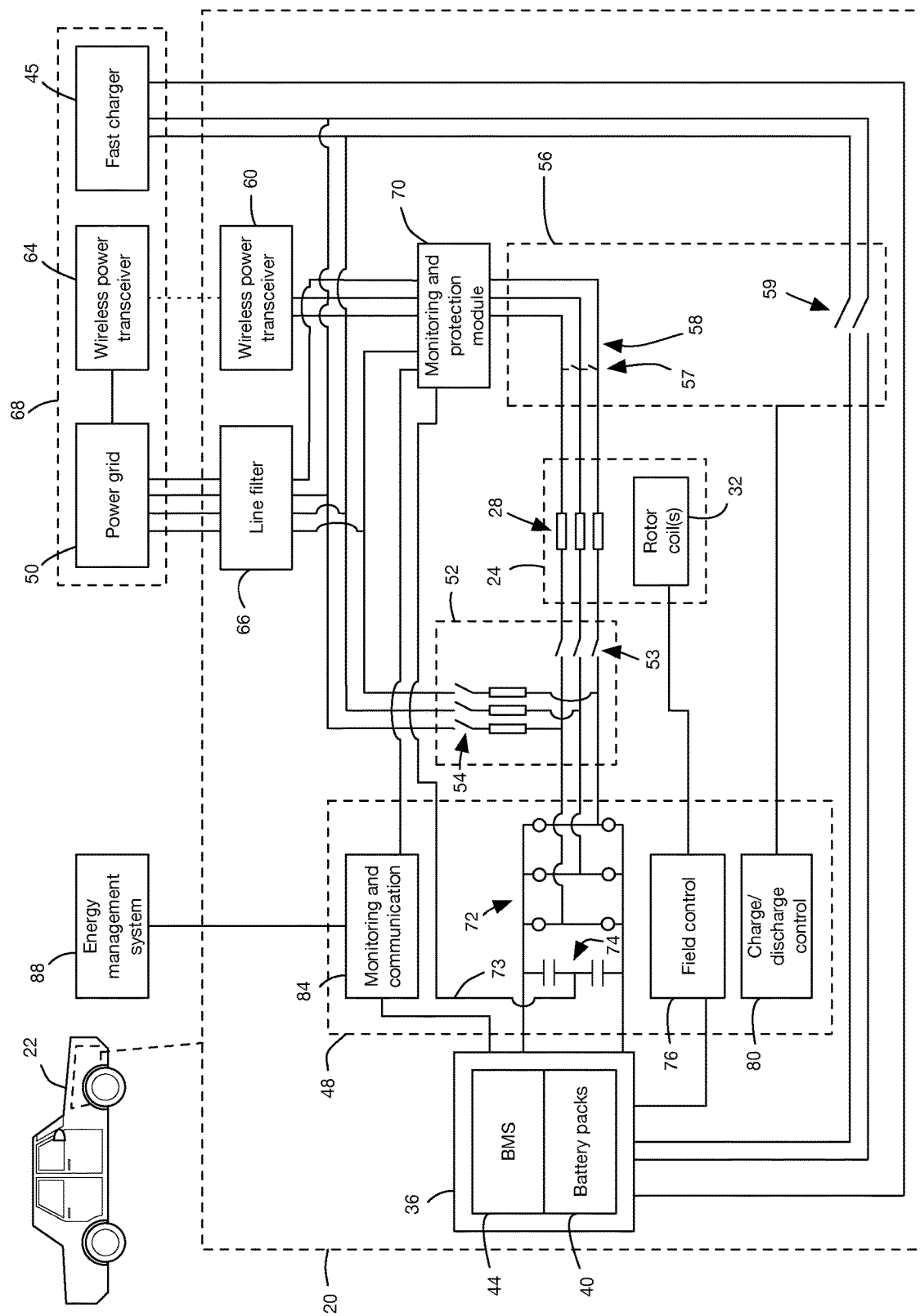
FIG. 1 is a schematic diagram of a charging system in accordance with an embodiment and its operating environment.
Figure 3A:
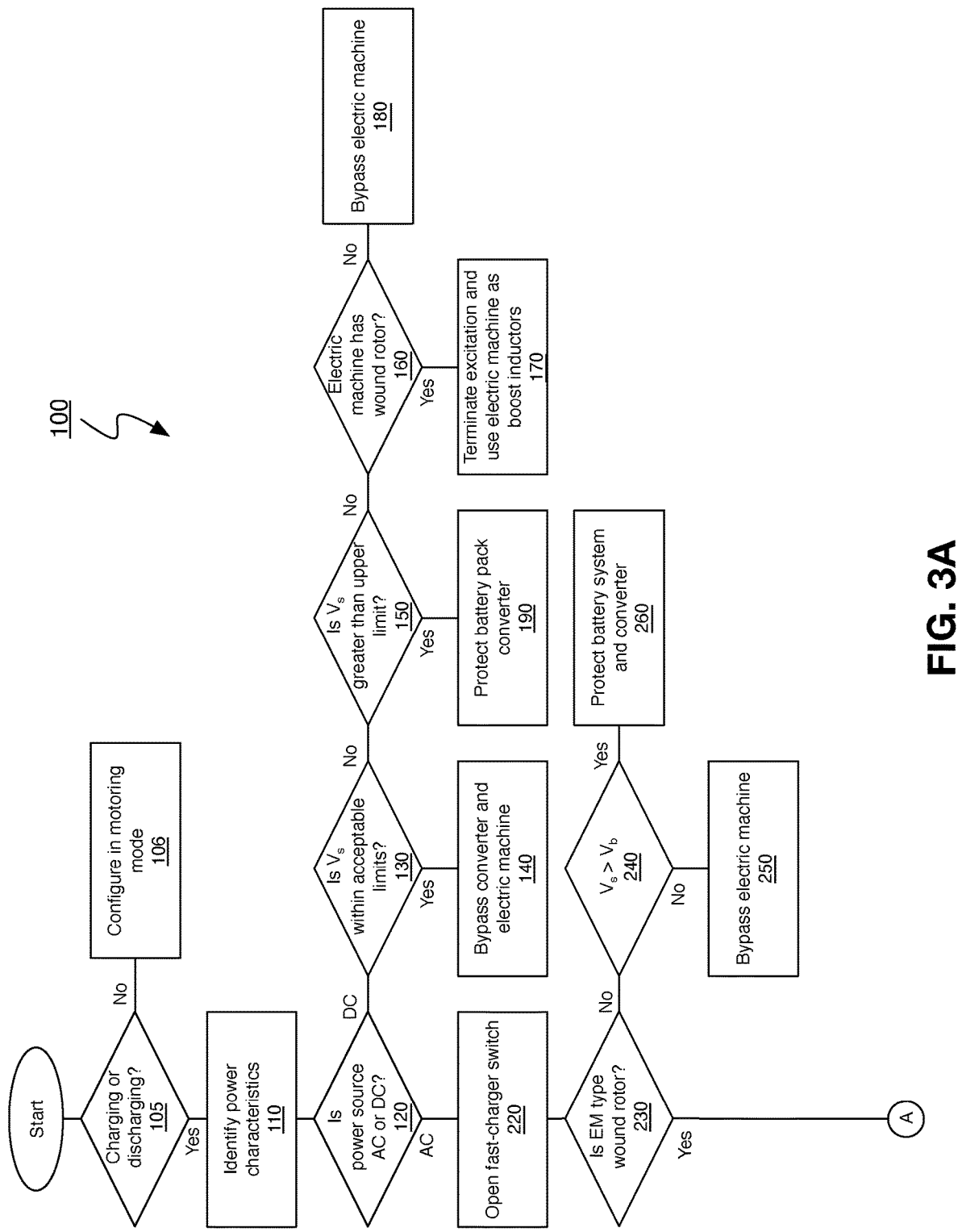
Figure 3B:
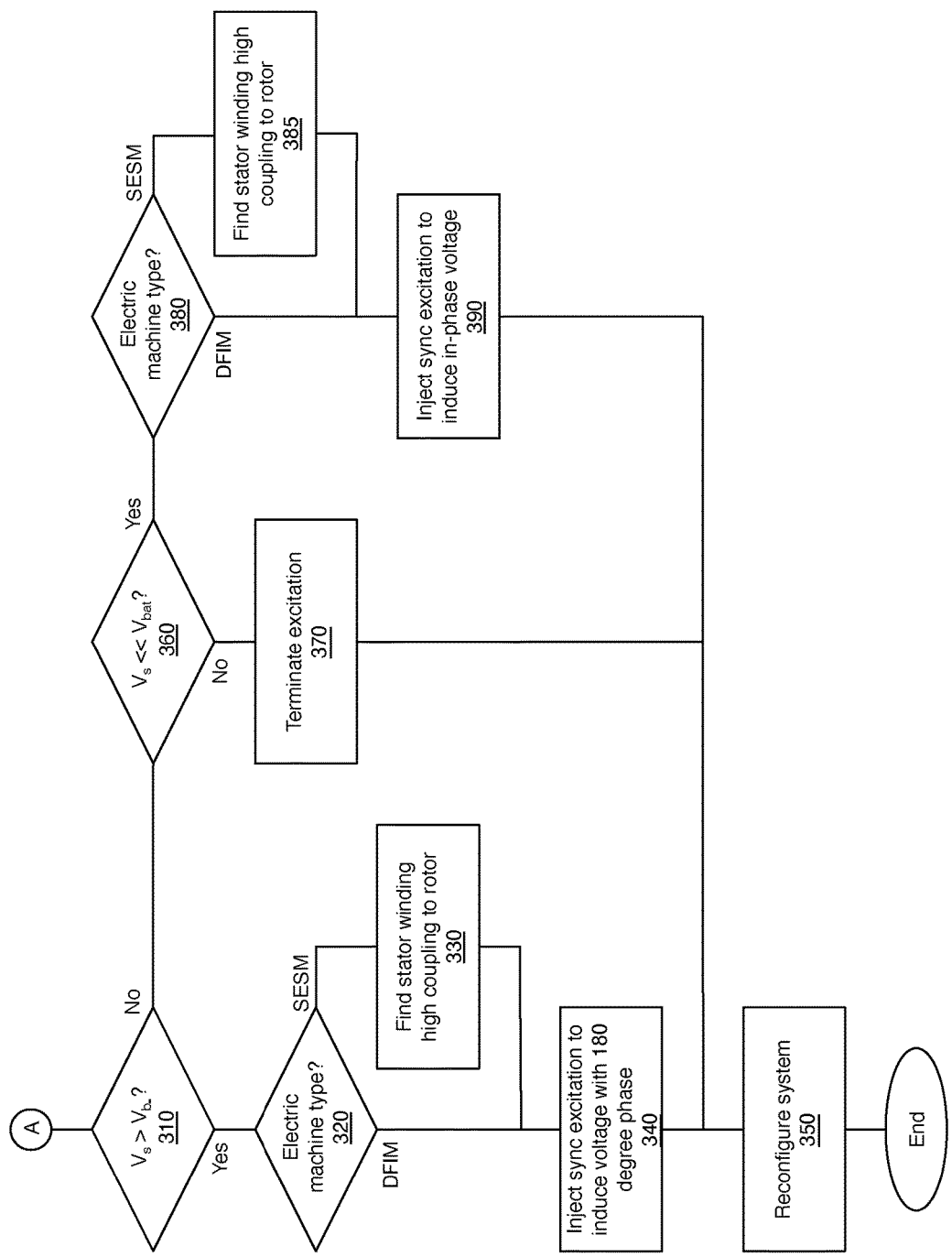
Figure 3C:
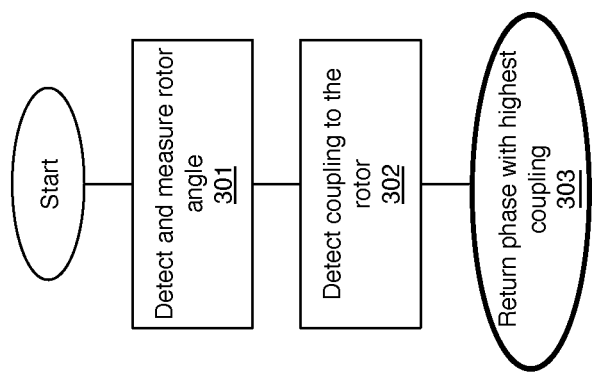
Figure 4A:
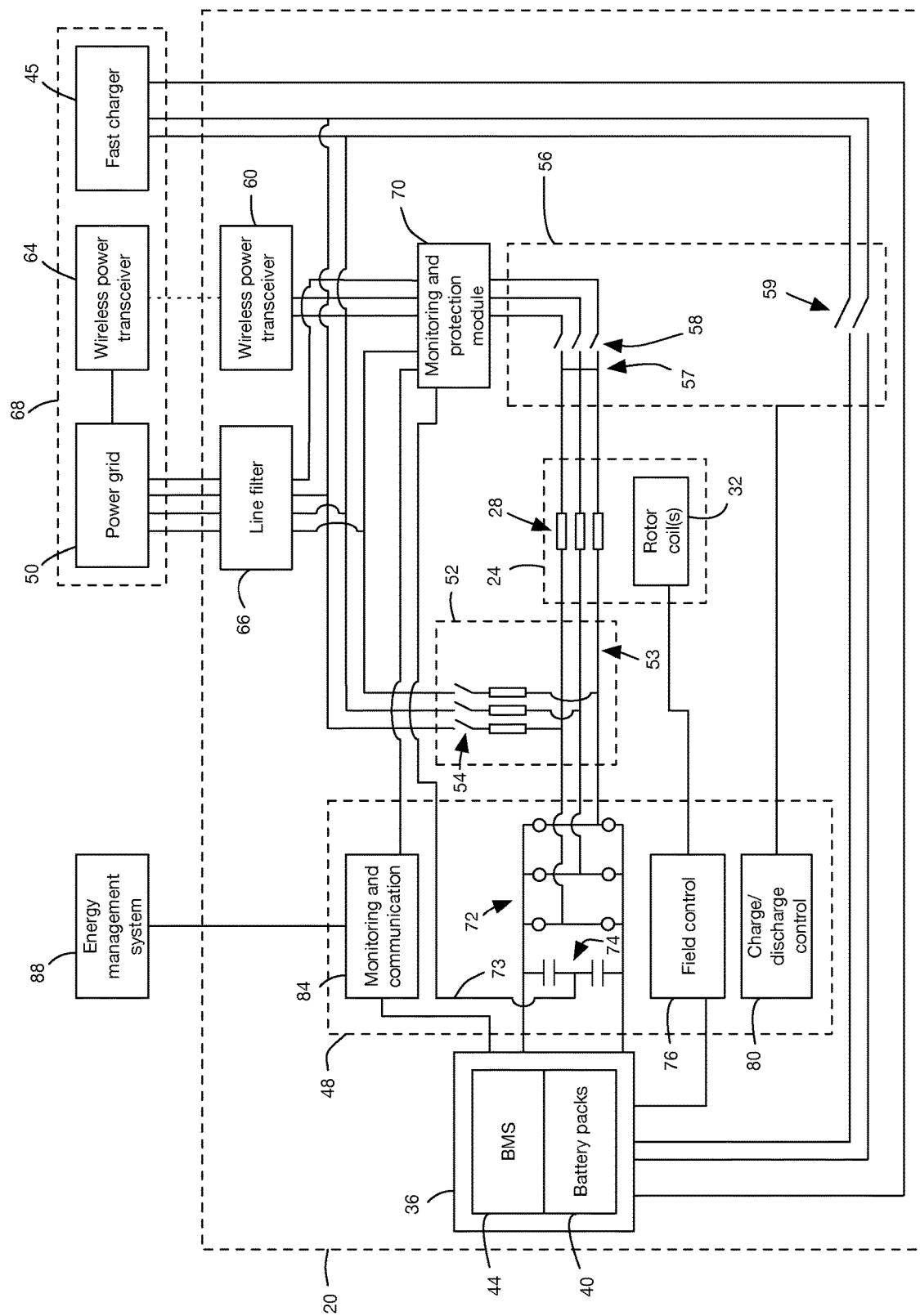
Figure 4B:
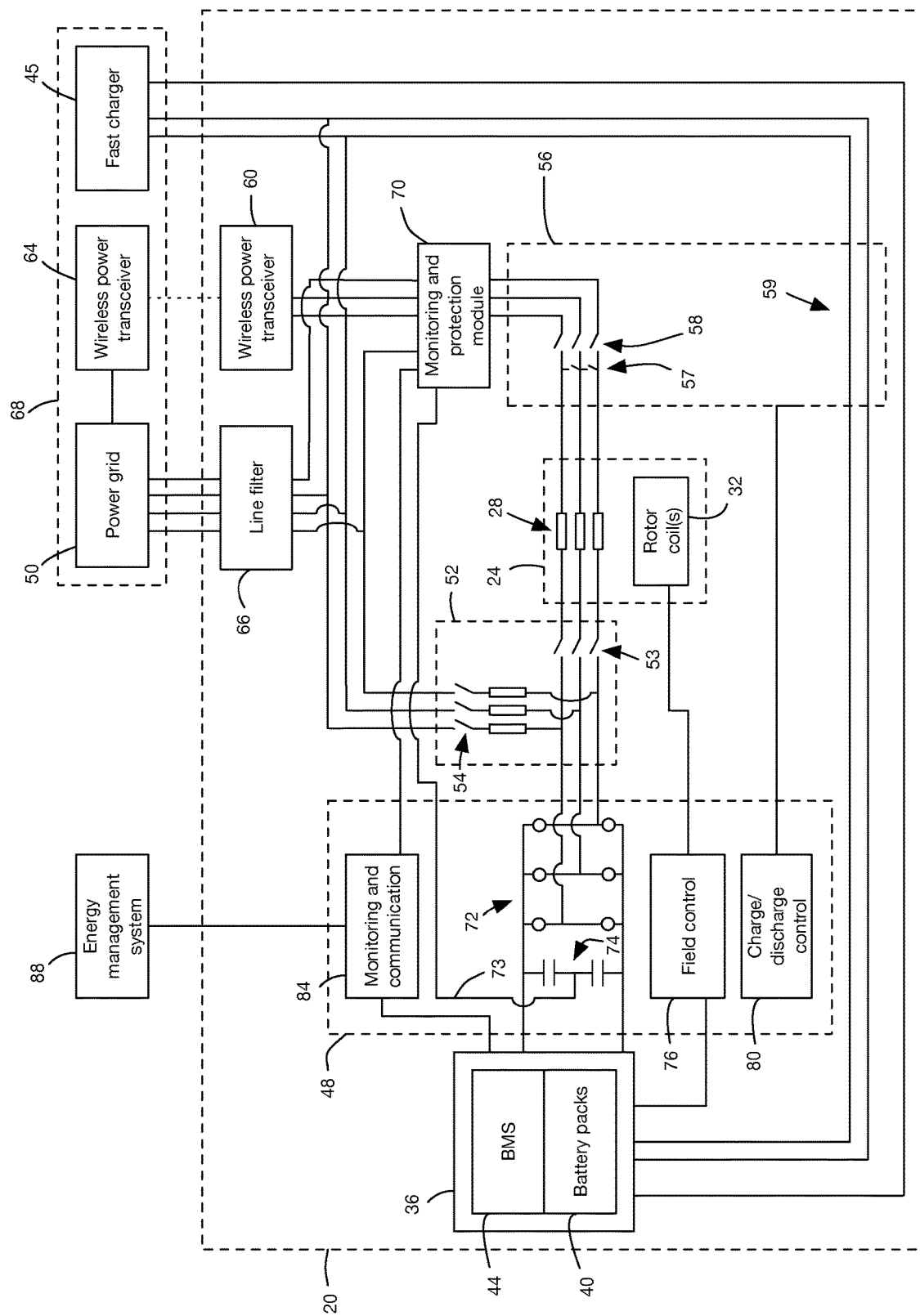
Figure 4C:
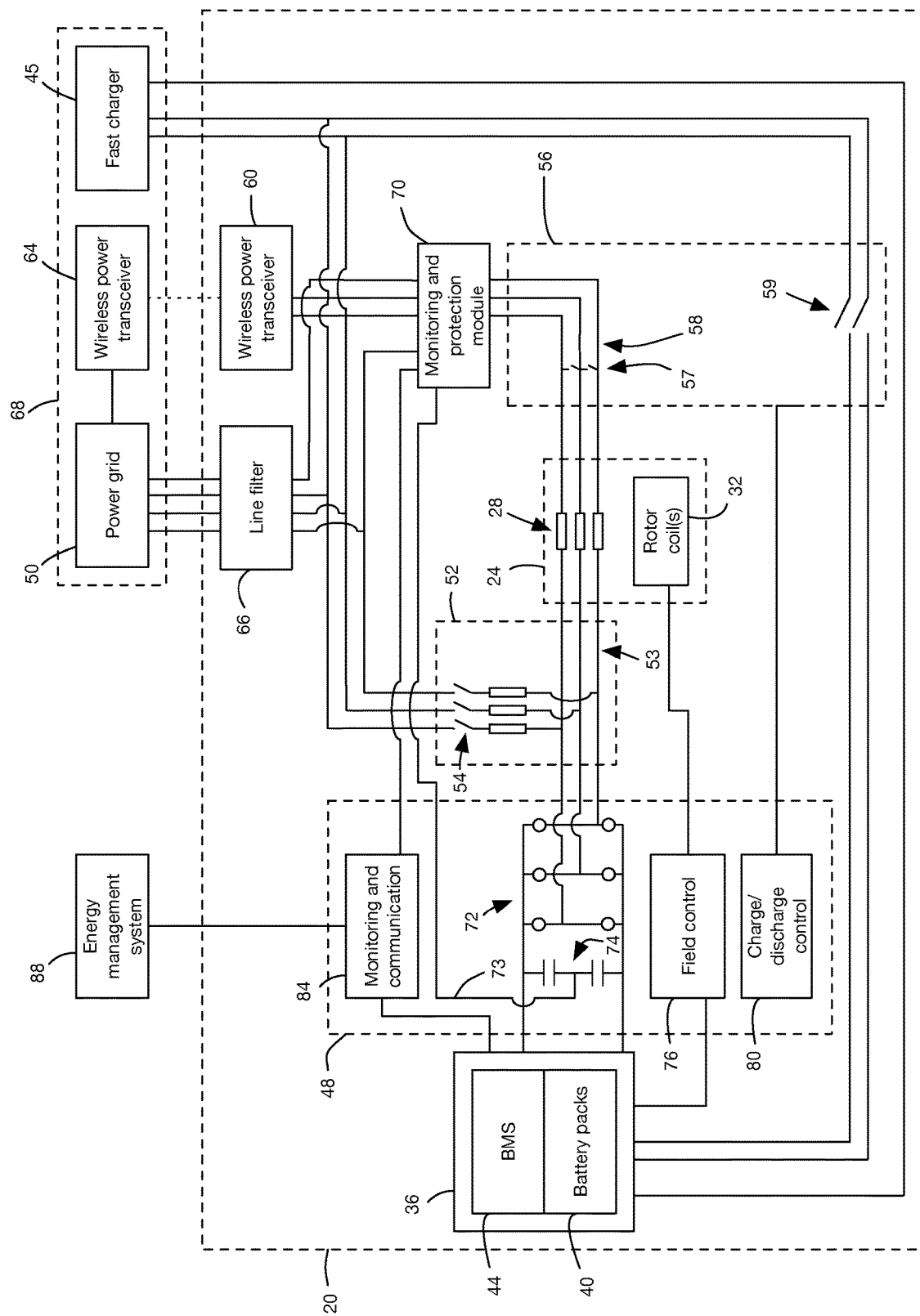
Figure 4D:
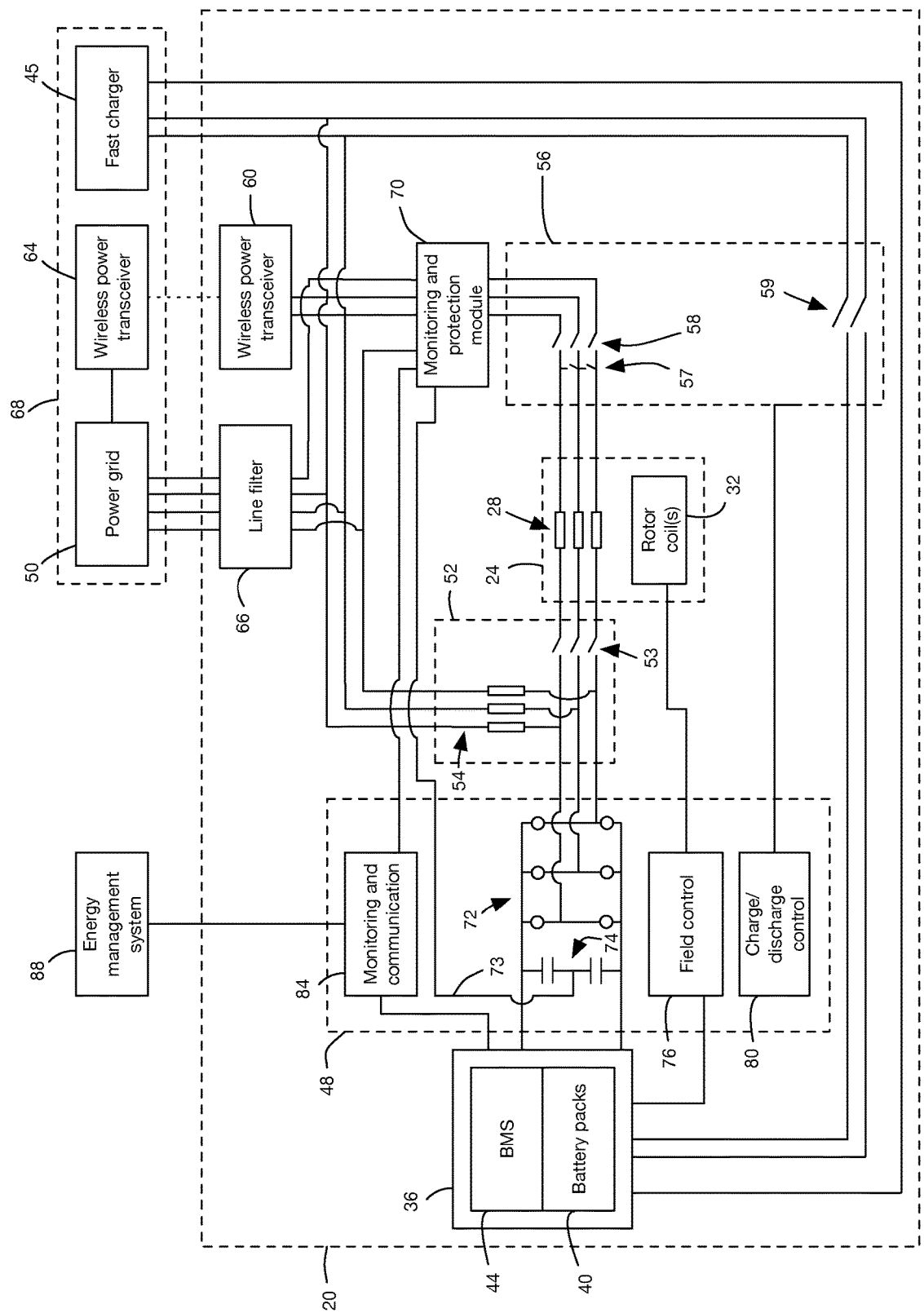
Figure 4E:
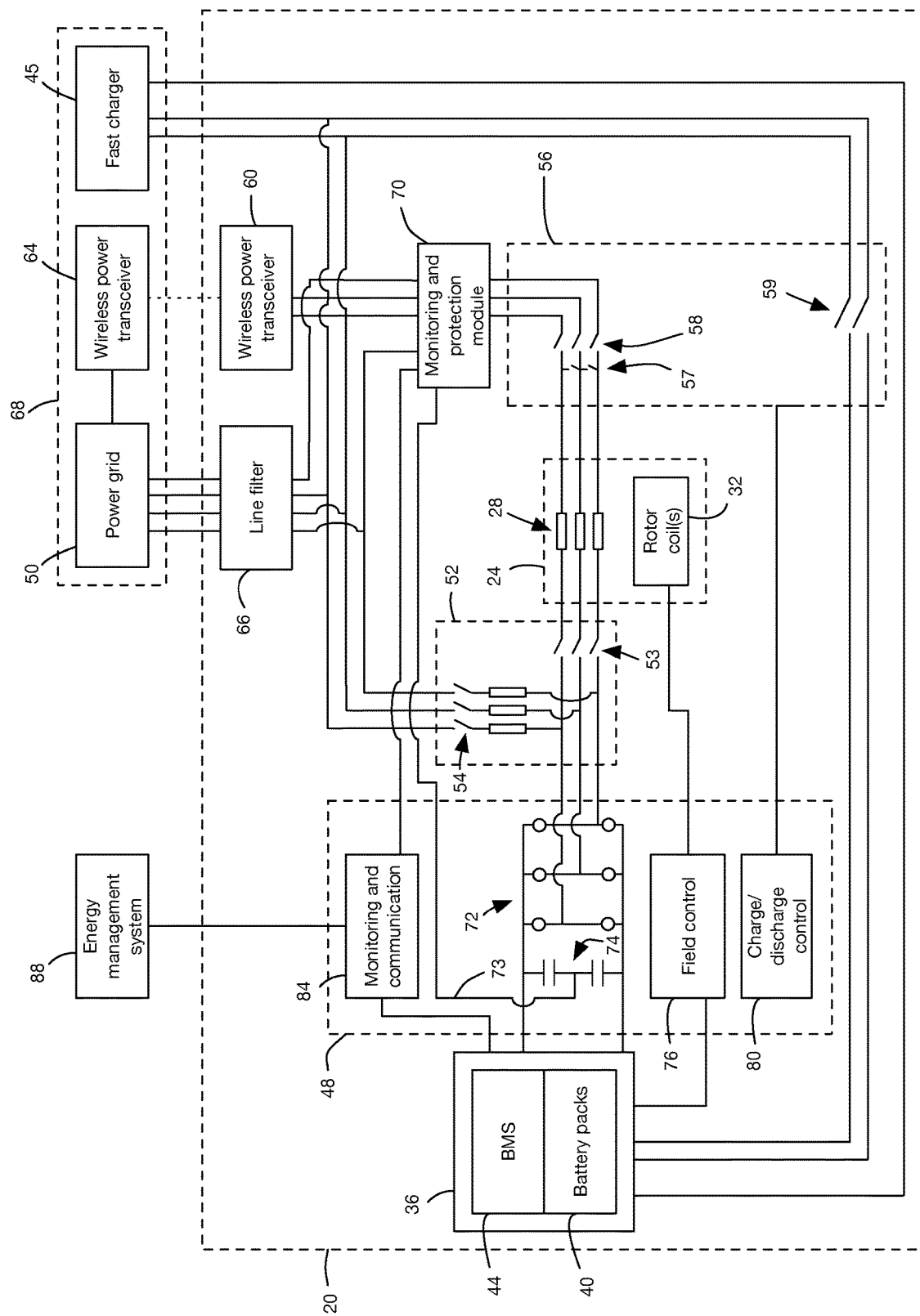
Figure 4F:
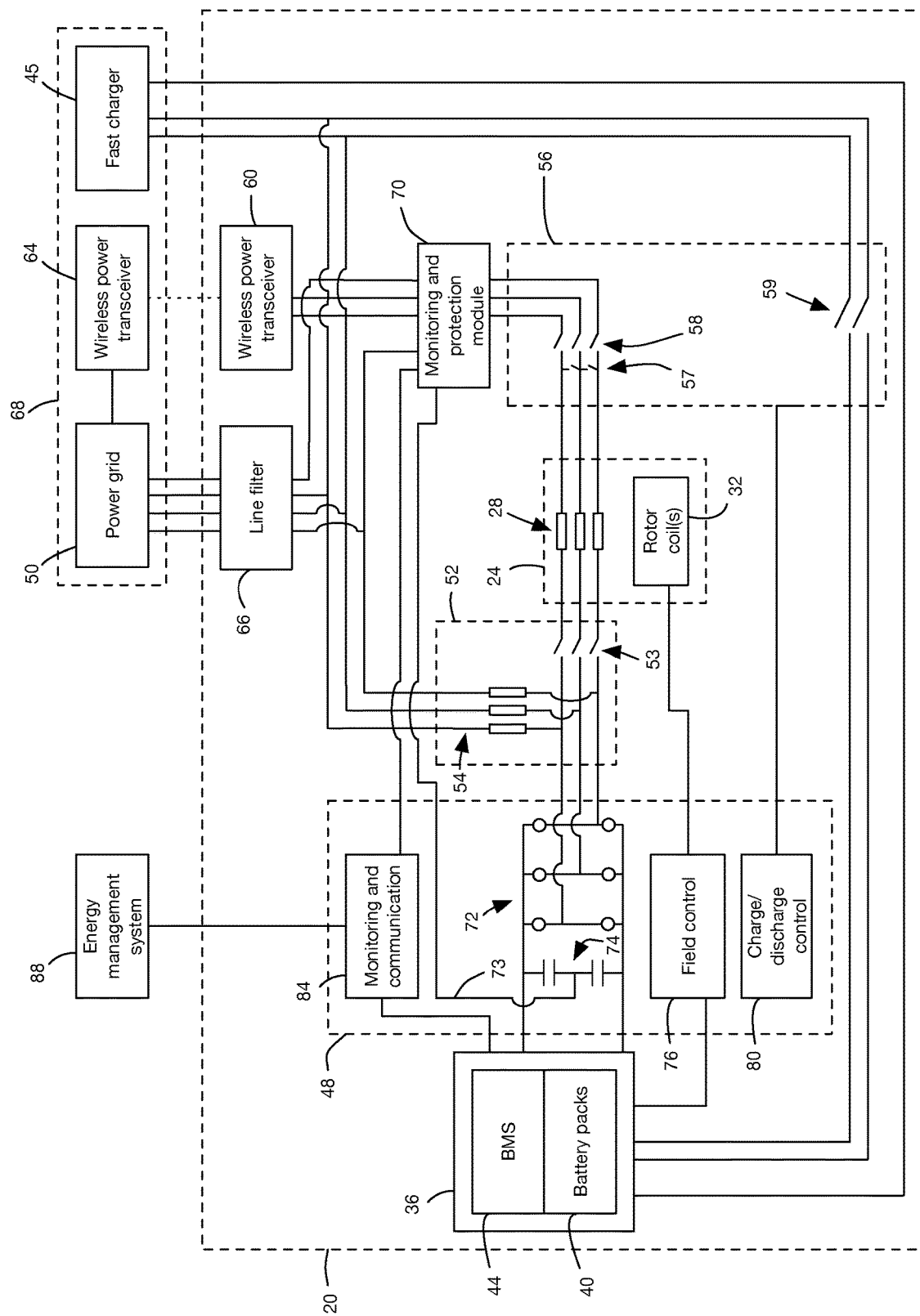
Figure 5:
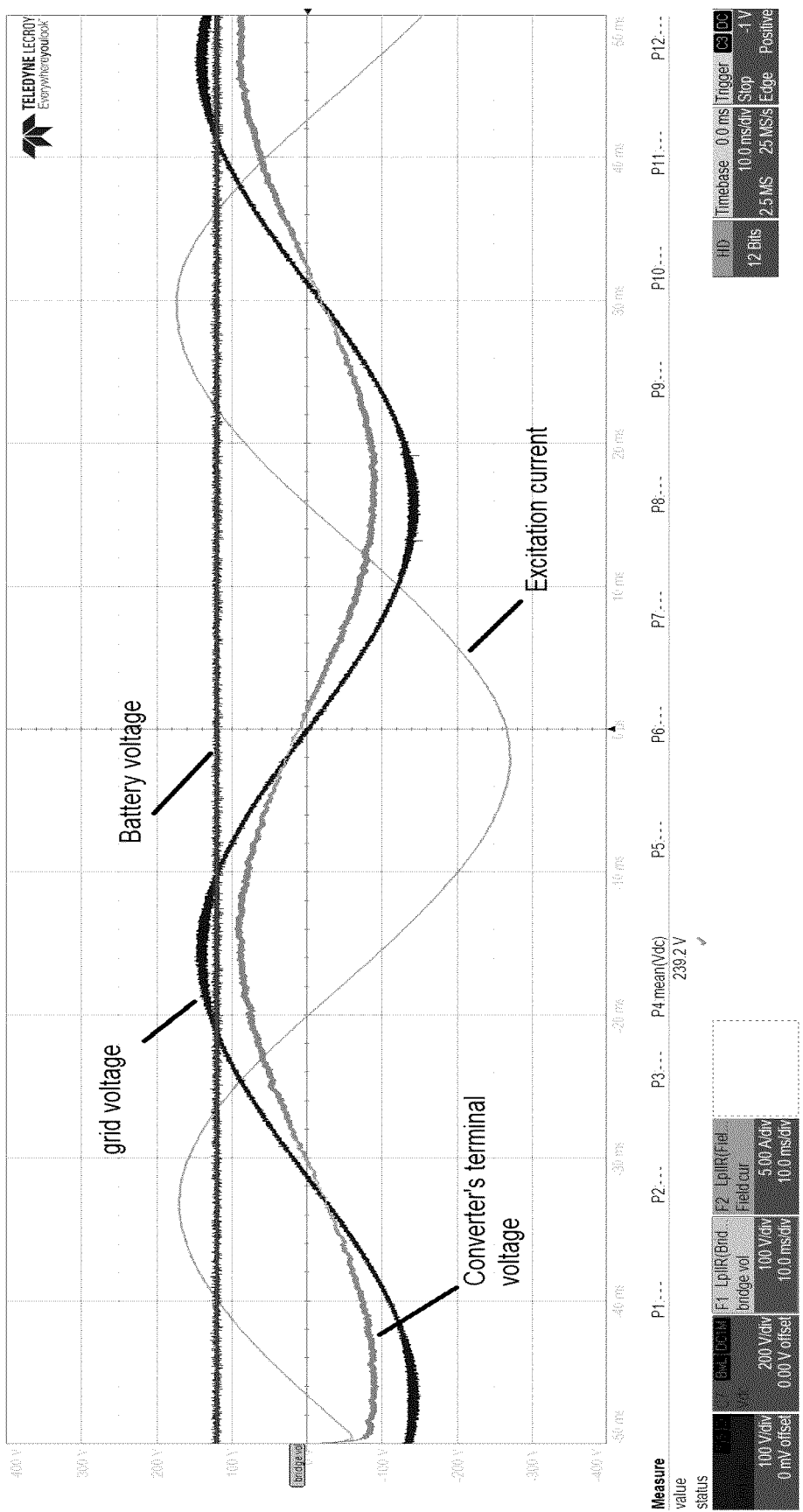
Figure 6:
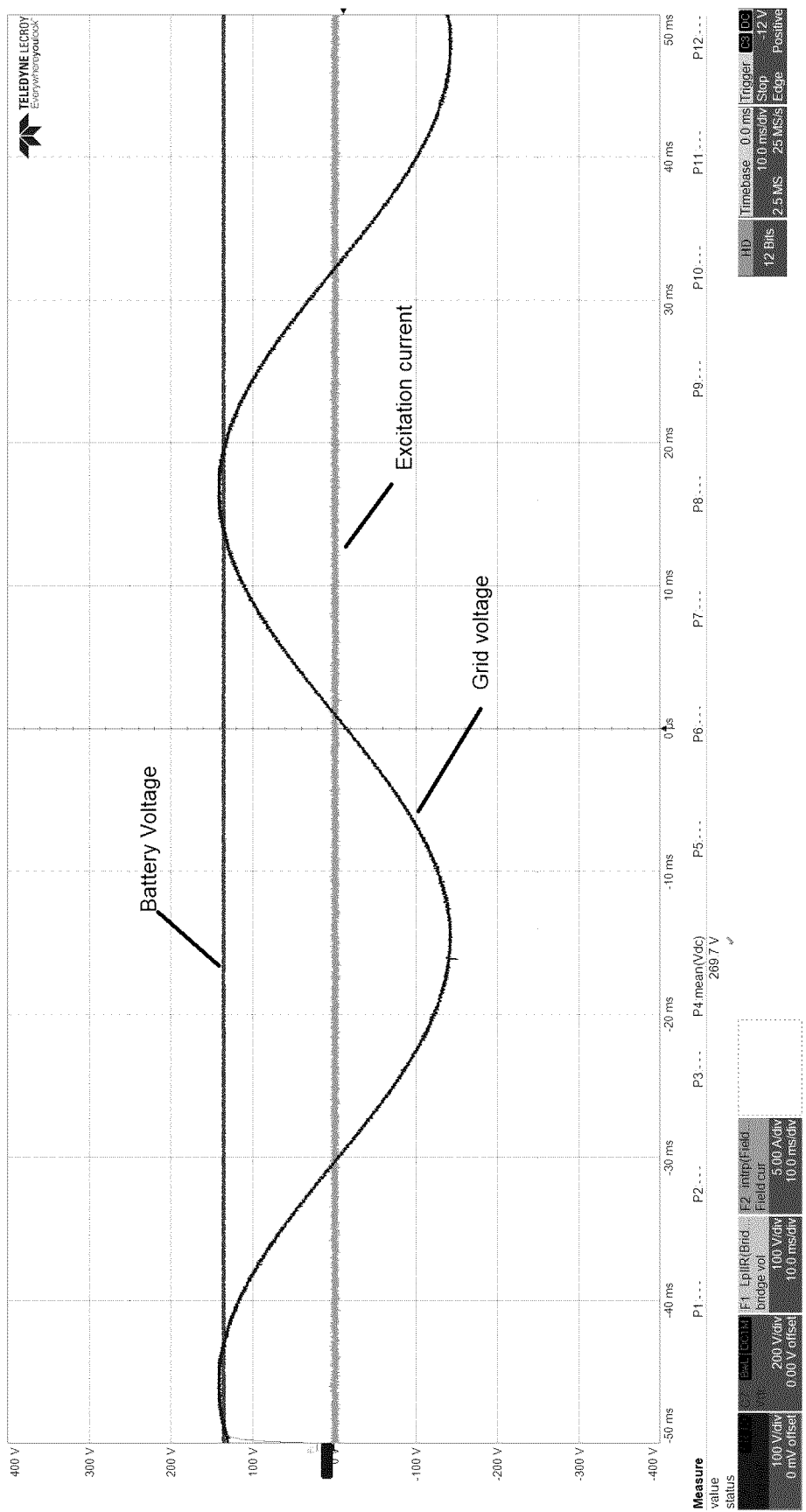
Figure 7:
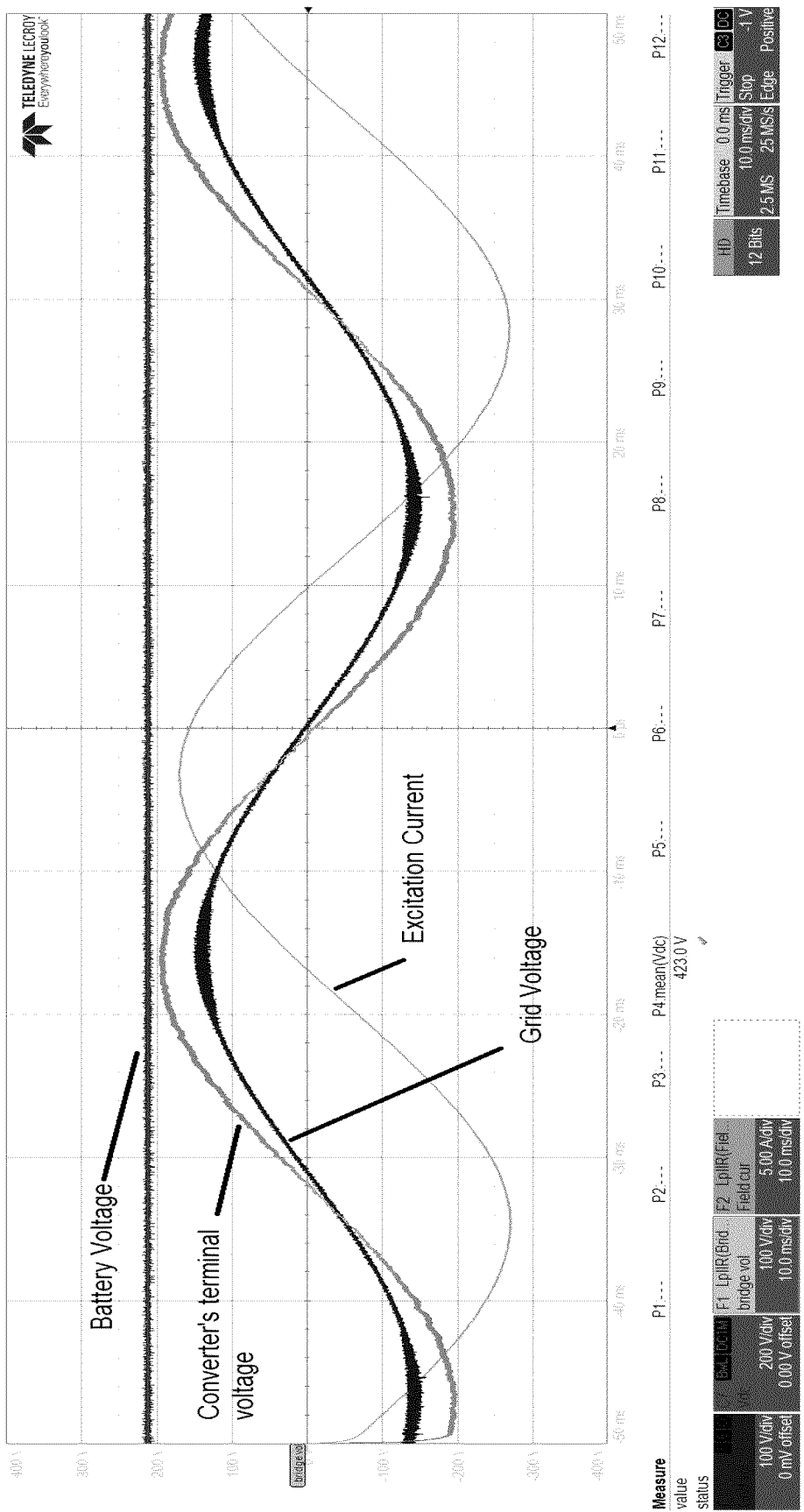

FIGS. 3A and 3B collectively show a flow chart of a method of charging using the charging system of FIG. 1;

FIG. 3C shows a flow chart of a magnetic coupling determination used by the charging system of FIG. 1;

FIG. 4A shows the charging system of FIG. 1 in a motoring mode;

FIG. 4B shows the charging system of FIG. 1 in a configuration in charging/discharging mode supplied by DC power source with acceptable voltage;

FIG. 4C shows the charging system of FIG. 1 with a wound-rotor machine showing a configuration in charging/discharging mode when connected to a DC power source with low voltage;

FIG. 4D shows the charging system of FIG. 1 with a not-accessible-rotor machine showing a configuration in charging/discharging mode when connected to a DC power source with low voltage;

FIG. 4E shows the charging system of FIG. 1 showing a configuration in charging/discharging mode under protection;

FIG. 4F shows the charging system of FIG. 1 showing a configuration in charging/discharging mode when connected to an AC power source wherein the electric machine is bypassed;

FIG. 5 shows waveforms of the charging system when excitation applied to decrease voltage at converter's terminals;

FIG. 6 shows waveforms of the charging system when no excitation is applied;

FIG. 7 shows waveforms of the charging system when excitation applied to increase voltage at the converter's terminals.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The present disclosure relates to a charging system adapted for charging and discharging to and from a battery pack. The act of discharging and charging may be facilitated by utilizing an existing electric machine and a motor controller, such as an inverter. As will be appreciated, the demands for electric or hybrid vehicles are significant, and thus the power capacity of their batteries is large. In some circumstances, it can be desirable to employ the charge stored by the battery to power other external devices, such as, for example, to provide emergency power to critical electronic devices during a power outage.

Figure 2:
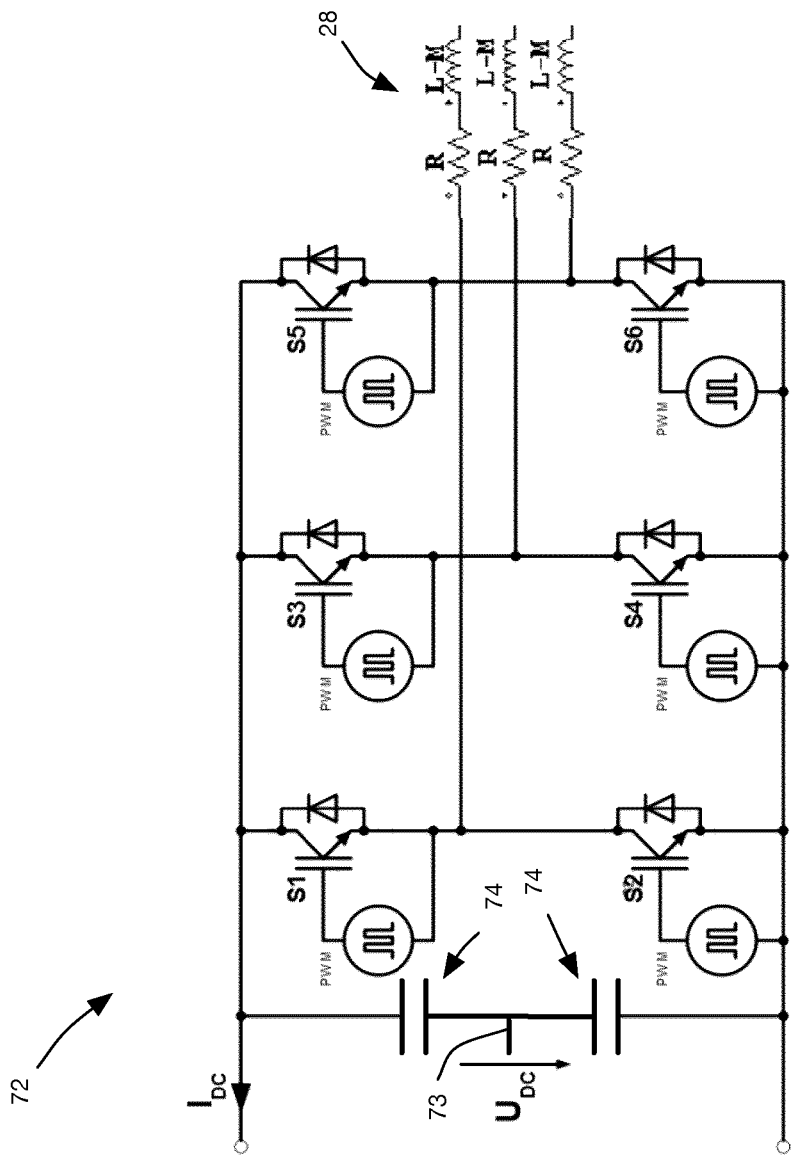
FIG. 2 shows a schematic diagram of a converter of the charging system of FIG. 1.

FIGS. 1 and 2 show a charging system 20 in accordance with an embodiment. The charging system 20 is integrated into the chassis of an electric vehicle 22, and includes an electric machine 24. The electric vehicle 22, in effect, forms a housing for the charging system 20. The electric machine 24 in this embodiment is a separately excited synchronous motor (SESM) that has two sets of windings. One set of stator windings 24 is on the stator, and the other set of windings 32 is on the rotor. In other embodiments, the electric machine 24 can be a wound rotor type such as separately excited synchronous motor or a doubly fed induction motor (DFIM). In yet other embodiments, the electric machine 24 can be non-wound rotor type such as permanent magnet, squirrel-cage induction, switched reluctance, and the like, and may include more than two sets of windings.

An electrical current is passed through the rotor windings 32 using brushes, slip rings, or any other suitable manner to generate and control the field, commonly referred to as excitation. The stator windings 28 are shown in an open-end configuration, but can be set up in other configurations by a set of switches 57, 58. In the particular embodiment, there are three stator windings 28 and one rotor winding 32.

Electrical power is supplied to the electric machine 24 by a battery system 36. The battery system 36 includes a set of one or more rechargeable battery packs 40 including cells connected in series or parallel providing a DC voltage. The battery packs 40 are managed by a battery management system (BMS) 44. The BMS 44 monitors the mode of operation of the charging system 20, operates to protect the battery packs 40 from operating outside their safe operating range, monitor and reporting the health of the battery packs 40, and manages other parameters such as amount of allowed current and charging strategy (CCCV, etc.). The battery packs 40 and the BMS 44 of the battery system 36 may be any such components known in the art and adaptable for the charging system 20.

The charging system 20 enables alternation between operating modes; in particular, a motoring mode, a charging mode, and a discharging mode. In the motoring mode, power is provided from the battery system 36 to the electric machine 24, feeding both the stator windings 28 and the rotor windings 32 in accordance with a desired scheme for causing the rotor to rotate, thereby transferring power to a transmission attached to the rotor. In a charging mode, power is received from an external power source, such as a power grid, to charge the battery packs 40 of the battery system 36. The external power source is bidirectional, meaning that it can both provide and receive power. The power source 68 can include, for example, a power grid, a fast charger, and a wireless power transceiver. The power received from or transmitted to the power source 68 can be alternating current (AC) or direct current (DC) provided by a utility grid, a fast charger, a wireless charger, etc. In a discharging mode, power is transferred from the battery packs 40 to a power load. The transferred power can be AC or DC, depending on the needs of the power load.

In order to control operation of the charging system 20 to alternate between modes of operation and to accommodate variances in the voltage of the power received during charging or to be supplied during discharging, a control system 48 communicates with the battery system 36 to synchronize the operating mode, and it controls operation of the electric machine 24, an input/output (I/O) selector 52, and a switch box 56. The I/O selector 52 is interposed between the electric machine 24 and the control system 48 and selects whether or not to involve the motor during the charging/discharging procedure. This is achieved by the I/O selector 52 making a connection between the battery system 36 and the electric machine 24 or a power source or load, such as a power grid 50, via two sets of switches. A set of battery-motor switches 53 connect or disconnect the battery system 36 to the electric machine 24 via the converter 72, and a set of battery-power source switches 54 connect or disconnect the battery system 36 to a power source 68 that includes the power grid 50. The I/O selector 52 allows bypass of the motor and use of additional inductors to perform the charging or discharging functionality. This is needed in a case that the motor is not of a wound-rotor type (e.g., permanent magnet, squirrel-cage induction, switched reluctance, etc.). It should be noted that a charging system will need either the I/O selector 52 or the switch box 56 according to design specifics. The power grid 50 is a grid of utility or any other type that provides energy and/or receives energy back. The grid type can be AC or DC, with at least 2 phases, or 1 phase and grid neutral, or DC. The switch box 56 is interposed between the electric machine 24 and the power grid 50, and controls coupling of the motor windings 28 to each other via a set of stator winding connector switches 57 or to the power grid 50 via a set of motor-power source switches 58. There is a set of switches 59 between the power source 68 and the battery pack 36 which enable to bypass the electric machine 24 and the converter 72 when the power source 68 is DC with an amplitude that is suitable for charging. The switches 53, 54, 57, 58, and 59 can be power switches, relays, contactors, or any other suitable type of switch. In the case that the number of rotor windings of the motor is less than three, the motor-power source switches 58 can have the capability of independent-pole control.

While the charging system 20 is shown having a separately excited synchronous motor (SESM) as electric machine 24, in other embodiments, it can alternatively include a doubly fed induction motor (DFIM). Further, the electric motor can also be a motor with non-wound rotor, but, in these scenarios, the motor is not involved during the charging/discharging procedure.

Connection to the power grid 50 can be made through either a wireless or wired interface. A wireless power transceiver 60 of the charging system 20 within the electric vehicle 22 is wirelessly coupled to a wireless power transceiver 64 positioned outside the electric vehicle 22 connected to the power grid 50. A wired connection is also can be made through a line filter 66.

The control system 48 includes a converter 72, shown in greater detail in FIG. 2, for converting direct current to alternating current and vice versa. The illustrated converter 72 is a 2-level, 3-phase converter. In other embodiments, the converter can be any suitable type of multi-level, multi-phase converter. The converter 72 controls the flow of electricity from the battery system 36 to the electric machine 24 or to the power grid 50 or from the power grid 50 to the battery system 36. The converter 72 includes a split dc-link. Accessible DC-link middle point 73 gives the converter 72 the capability of independent pole control, which makes it suitable for both single and 3-phase systems. To provide independent pole control the mid-point of the dc-link 73 may be connected to the power source neutral.

A field control module 76 of the control system 48 controls a flow of electricity from the battery system 36 to the rotor winding(s) 32. The field control is realized using an H-bridge or a similar scheme.

A charge/discharge control module 80 of the control system 48 is in communication with the switch box 56 that controls coupling of the motor's stator windings 28 either to each other or to the power side which can be power grid 50 or fast charger 45.

A monitoring and communication module 84 of the control system 48 is in communication with the power source 68 to decide the mode and manage the rate of charging or discharging based on the information it gets from an energy management system 88 and the battery management system 44. In addition, the monitoring and communication module 84 is in communication with the energy management system 88 for managing, provisioning, and billing. Support is provisioned in the monitoring and communication module 84 for proprietary or external management systems, cloud or other type. Feedback is provided about the amount of energy exchanged in charging or discharging mode, as well as the health of the battery system 36 shared via the BMS 44 communication protocol.

FIGS. 3A and 3B show the general method 100 of determining the configuration and operation of the charging system 20. The method 100 commences with the determination of whether the charging system 20 should be operated in the charging mode or the discharging mode (105), based on the information on utility and battery pack. The monitoring and communication module 84 of the control module 48 determines whether the charging system 20 is to be in a charging, discharging, or monitoring state. To make this decision, the monitoring and communication module 84 communicates with the BMS 44 to determine if the battery system 36 is able to charge, discharge, both, or none. Then the monitoring and communication module 84 communicates with the energy management system 88 to determine the user-selected mode of operation. The monitoring and communication module 84 can maintain a user account, an identifier of a user account managed or accessible to the energy management system 88, or an identifier that is associated with a user account managed or accessible to the energy management system 88. The user account includes a user-specified configuration as to how the charging system 20 is to behave under various circumstances. For example, the user account can indicate that discharging is permissible during a time range, and a minimum level of battery system capacity to be maintained. If the energy management system 88 is unavailable or no user account is specified, a default state (charging or discharging) is enabled, depending on the user configuration.

If the charging system 20 is not to be configured and operated in the charging mode or the discharging mode, the charging system 20 is configured in the motoring mode (106).

FIG. 4A shows the charging system 20 configured in the motoring mode. The battery-motor switches 53 of the I/O selector 52 are closed and the battery-power source switches 54 are opened to connect the battery system 36 to the electric machine 24 via the converter 72. In addition, the stator winding connector switches 57 are closed and the motor-power source switches 58 and fast charger switches 59 are opened, thereby isolating the electric machine 24 from the power source 68 and connecting the stator windings 28 to each other in the appropriate configuration (e.g., Wye, etc.). As a result, the electric machine 24 is coupled to the battery system 36 and decoupled from the power grid 50. In this mode, the electric machine 24 can act as a motor to drive the electric vehicle 22. The control system 48 implements a motor control strategy, such as FOC. If the electric machine is of a wound-rotor type, then while in motoring mode, the field control module 76 can affect a field excitation in the rotor winding(s) 32 of a constant current, unity flux control, unity power factor, or any other control type to allow operation of the motor.

Referring again to FIGS. 1, 3A, and 3B, the control module 48 determines a configuration and operation mode matching the detected power source 68, its characteristics (that is, its maximum voltage amplitude and type), and the condition of the battery pack 40. If the charging system 20 is charging or discharging, the power characteristics of the power source are determined (110). To properly control the charging system 20, the control system 48 needs to know characteristics of the voltage of the power source 68. In particular, the monitoring and protection module 70 measures power source 68 voltages and communicates with control system 48. The control system 48 finds the power source angle and frequency using an identification method algorithm e.g. a Phase Lock Loop (PLL). The power source type (AC or DC) is detected based on detected frequency, and voltage amplitude is found using measured instantaneous values by monitoring and protection module 70 and detected voltage angle.

Using the characteristics of the power source 68 determined at 110, it is determined if the power source 68 is alternating current (AC) or direct current (DC) (120). If the power source 68 is determined to be DC, it is determined if the voltage $V_s$ of the power source 68 is within acceptable limits of the battery system 36 (130). The BMS 44 maintains specifications for safe operation of the battery system 36, including a voltage range that can be received. In particular, the control system 48 communicates with the monitoring and protection module 70 to compare the voltages of the battery system 36 and the power source 68. If the voltage $V_s$ of the power source 68 is within the acceptable limits, the converter 72 and the electric machine 24 are bypassed (140). The control system 48 directs the I/O selector 52 to open the battery-motor switches 53 and the battery-power supply switches 54, and the control module 80 directs the switch box 56 to open the motor-power source switches 58 to decouple the electric machine 24 from the power source 68 and to close the fast-charger switches 59, thereby decoupling the electric machine 24 and the converter 72 from the battery system 36 and connecting the DC power source 68 directly to the battery system 36.

FIG. 4B shows the fast-charger switch 59 in a closed position so that charging and discharging of the battery system 36 is performed directly via the fast charger 45 of the power source 68. Both the converter 72 and the electric machine 24 are not used in this configuration. Any suitable charging algorithm can be employed, such as CCCV.

Referring again to FIGS. 1, 3A and 3B, if, instead, it is determined at 130 that the voltage $V_s$ of the power source 36 is not within the acceptable limits, it is determined if the voltage $V_s$ is greater than an upper limit of the battery system 36 (150). If the voltage $V_s$ is less than the lower limit, it is determined if the electric machine 24 includes a wound rotor (160). If the electric machine includes a wound rotor, excitation of the rotor winding(s) 32 is terminated and the electric machine stator winding(s) is/are used as the boost inductors (170). The control system 48 puts two of the stator windings 28 of the electric machine 24 between the power source 68 and the converter 72 to use the converter 72 to boost the voltage to an acceptable level. To do so, the control system 48 directs the I/O selector 52 to open the battery-power source switches 54 and close the battery-motor switches 53, and it directs the charge/discharge control module 80, to open the stator winding connector switches 57, and the fast-charger switches 59 and close motor-power source switches 58.

FIG. 4C shows the configuration of the charging system 20 in this condition. Each stator winding 28 is connected separately to the power source 68 and there is no connection between the stator windings 28. The electric machine 24 is interposed between the power source 68 and the converter 72. The control system 48 implements a control strategy via the converter 72. In charging mode, the stator windings 28 are used as inductors, and the converter 72 acts as a DC/DC converter. The control system 48 verifies that the charging system 20 is stationary, as it is not possible to use the electric machine 24 as a motor during charging or discharging. In discharging mode, power flows back to the power source 68. The motor windings 28 are used as inductors, and the converter 72 acts as a DC/DC converter in buck mode.

Returning again to FIGS. 1, 3A, and 3B, if the electric machine 24 is not a wounded-rotor type, the control system 48 inserts inductors between the converter 72 and the power source 68 (180). The control system 48 closes the battery-power source switches 54 and opens the battery-motor switches 53, the motor-power source switches 58, and the fast-charger switches 59.

FIG. 4D shows system configuration in this condition, wherein the control system 48 directs the I/O selector 52 to open the battery-motor switches 53 and close the battery-power source switches 54, thereby decoupling the electric machine 24 from the battery system 36. The charge/discharge control module 80 directs the switch box 56 to open the motor-power source switches 58 to decouple the electric machine 24 from the power grid 50.

Returning to FIGS. 1, 3A, and 3B, if, instead, it is determined that the voltage $V_s$ is greater than the upper limit at 150, then the control system 48 protects the converter 72 of the battery system 36 against overvoltage (190). To do so, the control system 48 directs the battery-power source switches 54, the motor-power source switches 58, and the fast-charger switches 59 to open.

FIG. 4E shows system configuration in this condition.

Returning again to FIGS. 1, 3A, and 3B, if it is determined that the power source 68 is AC at 120, the control system 48 directs the charge/discharge control module 80 to open the fast-charger switches 59 (220). Then it is determined if the electric machine type includes rotor windings (230). If the electric machine does not include accessible rotor windings, it is determined if the voltage $V_s$ of the power source is greater than the acceptable operation voltage $V_b$ of the battery system 36 (240). If the voltage $V_s$ of the power source is determined not to be greater than the acceptable operation voltage $V_b$ of the battery system 36 at 240, then the electric machine is bypassed (250). The control system 48 directs the I/O selector 52 to close the battery-power source switches 54 and open battery-motor switches 53. The charge/discharge control module 80 directs the switch box 56 to open switch 58 to decouple the electric machine 24 from the power source 68.

FIG. 4F shows the configuration of the charging system 20 in these circumstances. In this condition, the converter 72 along with the provided inductors act as a boost converter to charge/discharge the battery system 36.

Returning again to FIGS. 1, 3A, and 3B, in the case that electric machine does not include accessible rotor winding, if the voltage $V_s$ of the AC power source is determined to be greater than the voltage $V_b$ of the battery system 36 at 240, then the control system 48 protects the battery system 36 and the converter 72 against overvoltage (260). The control system 48 directs the I/O selector 52 to open switch 54. To do so, the control system 48 directs the battery-power source switches 54, the motor-power source switches 58 to open, therefore, decouples the electric machine 24 and converter 72 from the power source FIG. 4E shows the configuration of the charging system 20 in this condition.

Returning again to FIGS. 1, 3A, and 3B, if, instead, the electric machine type is a wound-rotor type (that is, any electric machine with accessible windings on the rotor, such as a separate-excited synchronous machine (SESM) or a doubly fed induction machine (DFIM)), it is determined if the voltage $V_s$ of the power source 68 is greater than the voltage $V_b$ of the battery system 36 (310). If the voltage $V_s$ of the power source 68 is greater than the voltage $V_b$ of the battery system 36, the control system 48 synchronizes the excitation current which is fed into the rotor winding(s) 32 with the voltage $V_s$ of the power source 68 in such a way that it induces voltages with a 180-degree phase shift in respect to the voltages of the power source 68 (340) into stator windings. This synchronization can be done by conventional PLL or any other suitable method. In the case that the electric machine 24 is a SESM (320), the stator winding with the highest magnetic coupling to rotor is found (330), shown in FIG. 3C at steps 301, 302 and 303, and synchronization and configuration is done accordingly. After synchronization, the control system 48 configures the charging system 20. The battery-motor switches 53 of the I/O selector 52 are closed and the battery-power source switches 54 are opened. Further, the stator winding connector switches 57 are opened and the motor-power source switches 58 are closed. FIG. 4C shows this configuration. The motor-power source switches 58 have independent pole operation. In the case where the electric machine 24 is a SESM, the pole connected to the stator winding with the highest magnetic coupling to the rotor is connected and two other poles remain open. Each of the stator windings 28 is connected separately to the power source 68 and there is no connection between the stator windings 28. This enables the voltage amplitude at the terminals of the converter 72 to be lowered and to keep the converter 72 at a boost region where it has controllability. FIG. 5 shows the voltage and current waveforms in this working condition.

If the voltage $V_s$ of the power source 68 is determined to be lower than or equal to the voltage $V_b$ of the battery system 36 at 310, it is determined if the voltage $V_s$ of the power source 68 is significantly lower than the voltage $V_b$ of the battery system 36 (360) i.e. when the control system 48 reaches the converter 72 boost or buck ratio limit, without reaching the required voltage to charge or discharge the battery system 36, respectively. If the voltage $V_s$ of the power source 68 is not significantly lower than the voltage $V_b$ of the battery system 36, it is deemed that the $V_s$ of the power source 68 is at an appropriate level for the converter 72 and battery system 36. Therefore, excitation of the rotor winding(s) is terminated and no current is injected into the rotor winding(s) (370). The charging system 20 is then reconfigured at 350 as FIG. 4C. FIG. 6 shows the voltage and current waveforms when the charging system 20 is configured as shown in FIG. 4C.

If the voltage $V_s$ of the power source 68 is significantly lower than the voltage $V_b$ of the battery system 36, the electric machine type is determined (380). If the electric machine type is a separately excited synchronous motor, the stator winding with the highest magnetic coupling to rotor is found (385) also shown in FIG. 3C at steps 301, 302 and 303, and synchronization is done accordingly. After synchronization, the control system 48 configures the charging system 20 as shown in FIG. 4C. The battery-motor switches 53 of the I/O selector 52 are closed and the battery-power source switches 54 are opened. Further, the stator winding connector switches 57 are opened and the motor-power source switches 58 are closed. The motor-power source switches 58 have independent pole operation. In the case where the electric machine 24 is a SESM, the pole connected to the stator winding with the highest magnetic coupling to the rotor is connected and two other poles remain open. Each of the stator windings 28 is connected separately to the power source 68 and there is no connection between the stator windings 28. This enables the voltage amplitude at the terminals of the converter 72 to be increased and to keep the converter 72 at a boost region with proper boost ratio. Control system 48 synchronizes the excitation current which is fed into the rotor winding(s) 32 with the voltage $V_s$ of the power source 68 in such a way that it induces voltages in-phase with the voltages of the power source 68 (390) into stator windings. By doing so, the amplitude of the voltage at the terminal of the converter 72 is raised to keep the boost ratio at an acceptable value. In particular, where the voltage level being received is insufficient to charge the battery system 36 in a proper manner, it is increased to at least to the minimum level required for this purpose, as shown in FIG. 7. The charging system 20 is then reconfigured at 350

As will be appreciated, the charging system 20 does not require external transformers such as those implemented at charging stations, DC/DC converters, or AC/DC converters such as those on-board in the case of mobile applications (e.g., an electric vehicle).

Thus, by using the I/O selector 52 and the switch box 56, the electric machine 24 can be selectively used to condition incoming or outgoing power based on the requirements of both the battery system 36 and the power source 68.

The system described herein is designed to be compatible with any grid system operating on DC or AC voltage and power, and with any electric machine.

While, in the above embodiment, the charging system is shown as a three-phase system, it will be appreciated that the charging system can be configured for a system with any number of phases.

In other embodiments, the charging system as described herein can be used for other types of applications, such as other types of vehicles or devices. In one particular example, an electric vehicle parked in a parking garage can be used to provide emergency loads during an outage and for stabilizing a power grid in emergency situations or participate in a vehicle-to-everything (V2X) scenario in a vehicular communication system.

It will be appreciated that the rotor can have more than one rotor winding and that a subset of the rotor windings can be controlled to provide the benefits described hereinabove.

Further, while particular reference has been made to power grids, other types of power sources or power loads can be used with the charging system.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS 20 charging system
24 electric machine
28 motor windings
32 rotor winding(s)
36 battery system
40 battery packs
44 BMS
45 fast charger
48 control system
50 power grid
52 I/O selector
53 battery-motor switches
54 battery-power source switches
56 switch box
57 stator winding connector switches
58 motor-power source switches
59 fast-charger switches
60 wireless power transceiver
64 wireless power transceiver
66 line filter
68 power source
70 monitoring and protection module
72 converter
73 mid-point of the dc-link
74 converter bypass switches
76 field control module
80 charge/discharge control module
84 monitoring and communication module
88 energy management system
100 method
105 charging or discharging?
106 operate in motoring mode
110 identify power characteristics
120 is power source AC?
130 is $V_s$ within acceptable limits?
140 bypass converter and electric machine
150 is $V_s$ greater than upper limit?
160 Is electric machine wound rotor?
170 terminate excitation and use electric machine as boost inductors
180 bypass electric machine
190 protect battery pack converter
220 open fast-charger switch
230 is EM type wound rotor?
240 $V_s > V_b$?
250 bypass electric machine
260 protect battery system and converter
310 $V_s > V_b$?
320 electric machine type?
330 find stator winding high coupling to rotor
340 inject sync excitation to induce voltage with 180 degree phase
350 reconfigure system
360 $V_s \ll V_b$?
370 terminate excitation
380 electric machine type?
385 find stator winding high coupling to rotor
390 inject sync excitation to induce in-phase voltage
301 detect and measure rotor angle
302 detect coupling to rotor
303 return phase with highest coupling to the rotor

What is claimed is:

1. A method of operating a charging system, the charging system comprising: (i) an electric machine comprising at least three stator windings and at least one rotor winding; and (ii) a control system comprising a converter coupled to the at least three stator windings and the at least one rotor winding for controlling excitation of each of the at least three stator windings and the at least one rotor winding; the method comprising:
(a) Operating in at least one of a charging mode or a discharging mode; and
(b) determining if a type of a power source is DC or AC; and
(i) upon determining that the type of the power source is DC, then performing one of the following steps:
(A) bypassing the electric machine to charge a battery system from the power source, upon finding the power supply voltage Vs of the power supply is within a voltage operating range of the battery system;
(B) using the stator windings as inductors wherein the converter acts as DC/DC in buck or boost mode, in said discharging or charging mode, respectively;
(C) protecting the battery system upon finding that Vs is greater than an upper limit of the voltage operating range; and
(ii) upon determining that the type of the power source is AC, then performing one of the following steps:
(A) injecting excitation into the at least one rotor winding to induce a voltage into the at least one of the stator windings with 180 degree phase shift to the voltage of the power source, upon finding the power supply voltage Vs of the power supply is greater than the voltage of the battery system;
(B) terminating the excitation into one of the at least one rotor winding, upon finding the power supply voltage Vs of the power supply is not significantly lower than the voltage of the battery system;

(C) injecting excitation into the at least one rotor winding to induce a voltage into the at least one of the stator windings in-phase with the voltage of the power source, upon finding the power supply voltage Vs of the power supply is smaller than an acceptable voltage of the battery system.

2. The method of claim 1, wherein the electric machine is a separately excited synchronous machine (SESM).

3. The method of claim 2, further comprising finding the one of the stator windings having the highest magnetic coupling to the rotor prior to injecting excitation into one of the at least one rotor winding.

4. The method of claim 1, wherein the connecting the fast charger to the battery system comprises, closing the set of fast-charger switches.

5. The method of claim 1, wherein the electric machine is a doubly fed induction machine (DFIM).

6. The method of claim 1, wherein the converter connects the battery system to the electric machine.

7. The method of claim 1, wherein upon said protecting the battery system, the set of fast-charger switches are opened.

8. The method of claim 1, wherein the power source comprises one or more of: a fast charger, a wireless power transceiver and a power grid.

9. The method of claim 1, wherein the battery comprises a plurality of battery packs and a battery management system.

10. The method of claim 1, wherein the charging system further comprises a monitoring and protection module in communication with a set of motor-power source switches interposed between the electric machine and the monitoring and protection module.

11. The method of claim 1, wherein the charging system further comprises a set of battery-motor switches, the method further comprising using the set of battery-motor switches to disconnect the battery system from the electric machine.

12. A charging system comprising: (a) an electric machine having at least three stator windings and at least one rotor winding; and (b) a control system coupled to the at least three stator windings and the at least one rotor winding for controlling excitation of each of the at least three stator windings and the at least one rotor winding; wherein:
 (a) the charging system is configured to operate in at least one of a charging mode or a discharging mode; and
 (b) the control system is configured to determine whether a type of a power source is AC or DC; and
 (c) the charging system is configured to perform any one of the following steps:
  (i) if the power source is DC, then (A) charge a battery system from the power source, upon finding the power supply voltage Vs of the power supply is within a voltage operating range of the battery system, or (B) use the electric machine's windings as inductors and the converter acts as DC/DC in buck or boost mode, in discharging or charging mode, respectively (C) protect the battery system upon finding that Vs is greater than an upper limit of the voltage operating range; and
  (ii) if the power source is AC, then: (A) inject excitation into the at least one rotor winding to induce a voltage in the at least one of the stator windings with 180 degree phase shift to the voltage of the power source, upon finding the power supply voltage Vs of the power supply is greater than the voltage of the battery system; (B) terminate the excitation into one of the at least one rotor winding, upon finding the power supply voltage Vs of the power supply is not significantly lower than the voltage of the battery system; or (C) inject excitation into the at least one rotor winding to induce a voltage into the at least one of the stator windings in-phase with the voltage of the power source, upon finding the power supply voltage Vs of the power supply is smaller than an acceptable voltage of the battery system.

13. The charging system of claim 12, wherein the electric machine is a separately excited synchronous machine (SESM).

14. The charging system of claim 13, prior to injecting excitation into one of the at least one rotor winding, the control system finds the one of the stator windings having the highest magnetic coupling to the rotor.

15. The charging system of claim 12, further comprising a set of fast-charger switches between the power source and the battery system, wherein the connecting the fast charger to the battery system comprises, closing the set of fast-charger switches.

16. The charging system of claim 12, wherein the electric machine is a doubly fed induction machine (DFIM).

17. The charging system of claim 12, wherein the control system comprises: a converter for connecting the battery system to the electric machine.

18. The charging system of claim 17, wherein the converter comprises a split dc-link.

19. The charging system of claim 18, wherein the power source type is AC and a midpoint of the split dc-link is electrically connected to a neutral line of the power source.

20. The charging system of claim 19, further comprising motor-power source switches enabling independent pole operation when desired.

21. The charging system of claim 15 further comprising a set of battery-motor switches and a set of battery-power source switches, wherein upon said protecting the battery system, the set of fast-charger switches, the set of battery-motor switches, and the set of battery-power source switches are opened.

22. The charging system of claim 12, wherein the power source comprises one or more of: a fast charger, a wireless power transceiver and a power grid.

23. The charging system of claim 12, wherein the battery comprises a plurality of battery packs and a battery management system.

24. The charging system of claim 12, further comprising a monitoring and protection module in communication with a set of motor-power source switches interposed between the electric machine and the monitoring and protection module.

25. The charging system of claim 12, further comprising a set of battery-motor switches that connect or disconnect the battery system to the electric machine.

26. A charging system comprising: (a) a non-wound rotor type electric machine; and (b) a control system coupled to the electric machine wherein upon determining the voltage of a power source, charging or discharging a battery system can be enabled by bypassing the non-wound rotor type electric machine.

* * * * *